United States Patent

Wakuta et al.

[11] Patent Number: 5,127,485
[45] Date of Patent: Jul. 7, 1992

[54] ELECTRIC MOTORIZED WHEEL WITH INTEGRAL MOTORIZED COOLING OIL PUMP

[75] Inventors: Satoru Wakuta; Yukihiro Minezawa; Shinichi Otake; Yutaka Hotta, all of Anjo, Japan

[73] Assignee: Aisin Aw Co., Ltd., Japan

[21] Appl. No.: 369,337

[22] Filed: Jun. 21, 1989

[30] Foreign Application Priority Data

Jun. 29, 1988 [JP] Japan ............... 63-161306
Aug. 22, 1988 [JP] Japan ............... 63-207758
Oct. 26, 1988 [JP] Japan ............... 63-271906

[51] Int. Cl.⁵ .............. B60K 11/02; H02K 7/10; H02K 9/19
[52] U.S. Cl. .............. 180/65.5; 180/65.6; 310/54; 310/67 R
[58] Field of Search .............. 310/54, 61, 62, 63, 310/64, 67 A, 67 R; 180/65.1, 65.5, 65.6, 65.7

[56] References Cited

U.S. PATENT DOCUMENTS

| | | | |
|---|---|---|---|
| 3,161,249 | 12/1964 | Bouladon et al. | 180/65.5 |
| 3,812,928 | 5/1974 | Rockwell et al. | 180/65.5 |
| 3,892,300 | 7/1975 | Hapeman et al. | 180/65.5 |
| 3,897,843 | 8/1975 | Hapeman et al. | 180/65.5 |
| 4,244,098 | 1/1981 | Barcus | 29/596 |
| 4,647,805 | 3/1987 | Flygare et al. | 310/61 |
| 4,799,564 | 1/1989 | Iijima | 180/65.5 |
| 4,930,590 | 6/1990 | Love et al. | 180/55 |

FOREIGN PATENT DOCUMENTS 247220 9/1963 Australia .............. 180/65.5

Primary Examiner—Steven L. Stephan
Assistant Examiner—Dennis R. Haszko
Attorney, Agent, or Firm—Lorusso & Loud

[57] ABSTRACT

An electric motor equipped with a cooling apparatus in which an oil reservoir (2b) filled with a cooling oil is provided in the lower portion of a casing (1). Provided in the casing is at least a portion of an oil passageway (2f, 4c, 28) which communicates with the oil reservoir (2b) and which opens within the casing (1) above and below a coil (6d) of the motor. The oil casing is internally provided with an oil pump (27) which causes the cooling oil to flow through the oil passageway (2f, 4c, 28). Accordingly, the cooling apparatus, which comprises the oil reservoir (2b), at least a portion of the oil passageway (2f, 4c, 28) and the oil pump (27), is provided within the casing (1) of the electric motor and integrated therewith. As a result, the electric motor is made more compact overall despite the provision of the cooling apparatus. Since the coil (6d) of the motor is positively cooled by the cooling apparatus, a large current can be passed through the coil. This enables the electric motor to generate a high output torque.

6 Claims, 11 Drawing Sheets

ELECTRIC MOTORIZED WHEEL WITH INTEGRAL MOTORIZED COOLING OIL PUMP

BACKGROUND OF THE INVENTION

This invention relates to an electric motor equipped with an apparatus for cooling a motor.

An electric motor referred to as a wheel motor is often used in arrangement with each of the wheels of a motorized vehicle such as a forklift or golf cart as means for driving the vehicle.

In a motorized vehicle, the wheels of the vehicle during travel move up and down due to unevenness in the surface of the road, and the wheels are turned to the left and right when the vehicle is steered. Consequently, when the aforementioned electric motor is disposed in operative association with each of the wheels, the arrangement must be such that the electric motor will not interfere with the corresponding wheel when the wheel undergoes the motions described. This means that there are space limitations as far as installation of the electric motor is concerned. Therefore, in order to install the electric motor in the limited space available, it is required that the electric motor be made as small as possible.

On the other hand, since a motorized vehicle is such that a comparatively heavy vehicle body must be moved, it is required that the output torque of the electric motor be considerably high.

In order to obtain an electric motor which is both compact and capable of delivering high output torque, a large current must be passed through the coil of the motor proper. However, passing a large current through the coil can cause the coil to heat up and eventually burn out. For this reason, it is required that the coil of the motor be cooled.

Conventionally, a cooling apparatus which performs such cooling is provided separately of the electric motor, and oil or air is used as the coolant. Accordingly, space must be separately provided in order to install the cooling apparatus. However, it is very difficult to provide additional space for accommodating the cooling apparatus where the space for installation of the electric motor is already limited, as in the aforementioned motorized vehicle. Furthermore, if it is attempted to force the cooling apparatus into the cramped space that is available, there is the danger that the cooling apparatus will interfere with the corresponding wheel when the wheel moves up and down as well as to the left and right. This means that a constraint must be placed upon movement of the wheel.

Thus, it is very difficult to provide both the electric motor and its cooling apparatus in a limited space. This has made it almost impossible to raise the output of a compact electric motor.

Further, in the prior art, the cooling apparatus is driven in concert with the electric motor. Hence, the cooling apparatus applies cooling to the motor coil even when the coil is not all that hot. This only wastes energy and results in inefficient cooling of the motor. Moreover, since a pump associated with the cooling apparatus is driven more than needed, the service life of the pump is curtailed.

Conventionally, the power fed to the motor and to a pump motor or fan motor in the cooling apparatus is supplied separately via a number of power supply lines from a power supply mounted on the vehicle frame. When the electric motor is used as a wheel motor, it is supported on the vehicle frame via a suspension or the like. However, since the suspension forms a relatively movable object which allows relative motion between the vehicle frame and the wheel motor, a number of electric lines such as the aforementioned complicated arrangement of power supply lines must be installed through the movable object. Thus disposing a number of electric lines through the movable object invites wire breakage and diminishes reliability.

SUMMARY OF THE INVENTION

An object of the present invention is to provide an electric motor the overall size of which is reduced despite the provision of a cooling apparatus therefor, thereby dispensing with the need to provide an overly large motor installation space and making it possible to obtain a high output from the electric motor.

Another object of the present invention is to provide an electric motor in which, when the electric motor is used as a wheel motor, the coil of the wheel driving motor can be cooled efficiently while energy is conserved to the greatest possible extent, and in which service life of a cooling pump can be prolonged.

Yet another object of the present invention is to provide an electric motor the reliabilty of which is enhanced by minimizing the number of electric lines passed through the aforementioned movable object.

According to the present invention, the foregoing objects are attained by providing an electric motor equipped with a cooling apparatus in which an oil reservoir filled with a cooling oil is provided in a casing at the lower portion thereof. Provided in the casing is at least a portion of an oil passageway which communicates with the oil reservoir and which opens within the casing above and below a coil of the motor. The oil casing is provided with an oil pump which causes the cooling oil to flow through the oil passageway.

Further, the invention is characterized in that the outer surface of the casing is provided with cooling fins.

In another aspect of the invention, there is provided an electric motor for a vehicle equipped with a wheel driving motor accommodated within a case on which a rotary shaft is rotatably supported, the electric motor comprising an oil reservoir formed within the case, an oil pump provided within the case, an oil passageway communicating the oil pump with the oil reservoir, communicating means communicating with the oil pump for supplying oil to a coil of the wheel driving motor, a pump driving motor for driving the oil pump, sensors for sensing vehicle traveling state, and a motor control unit to which signals from the sensors are inputted for controlling the pump driving motor.

Further, according to the invention, a cooling apparatus is disposed within a casing of an electric motor and power supply lines for a cooling motor of the cooling apparatus are connected to power supply lines of a motor of the electric motor.

Further, according to the invention, oil is used as the coolant. Therefore, an oil reservoir filled with the cooling oil is provided in a casing at the lower portion thereof. Provided in the casing is at least a portion of an oil passageway which communicates with the oil reservoir and which opens within the casing above and below a coil of the motor. The oil casing is provided with an oil pump and a pump motor which cause the cooling oil to flow through the oil passageway. A cooling apparatus is thus constructed. The power supply lines to the pump motor are connected to the power supply lines of the electric motor within the casing. Moreover, the present invention is such that a control circuit for controlling the pump motor is provided within the casing.

Further, the invention is characterized in that the control circuit is controlled based on the temperature of the motor or the amount of current flowing through the motor.

By virtue of the foregoing arrangement, the electric motor equipped with the cooling apparatus is such that the cooling apparatus, which comprises the oil reservoir, at least a portion of the oil passageway and the oil pump, is provided within the casing of the electric motor and integrated therewith. As a result, the electric motor is not significantly increased in size despite the provision of the cooling apparatus. This makes it possible to maintain the compactness of the electric motor. Moreover, space for installing the cooling apparatus need not be provided.

Accordingly, the inventive electric motor equipped with the cooling apparatus can be readily installed even if the space available for such installation is limited. And since the coil of the motor is positively cooled by the cooling apparatus, a large current can be passed through the coil.

Thus, though the electric motor of the invention is small in size, it is capable of generating a high output torque.

Further, the cooling fins assure that the heat possessed by the oil will be given off effectively. This greatly enhances the effectiveness with which the motor coil is cooled.

In accordance with the invention, the pump driving motor is driven and controlled by the motor control unit based on the output signal from the sensors which sense the traveling state of the vehicle. Since the oil pump can thus be driven under optimum conditions in accordance with the traveling state of the vehicle, the coil of the wheel driving motor is efficiently cooled the required amount by the cooling apparatus only when necessary. This makes it possible to greatly reduce the energy consumed. Also, the service life of the oil pump is prolonged since it is not kept running at all times.

Further, in accordance with the invention, the power supply lines of the cooling motor of the cooling apparatus are conected to the power supply lines of the motor within the casing of the electric motor. As a result, the cooling motor is driven by a portion of the current which flows through the power supply lines of the electric motor. In this case, the power supply lines exclusively for the cooling motor do not extend to the outside of the casing. In particular, when oil is used as the coolant, current is supplied from the power supply lines of the motor to the pump motor of the cooling oil pump.

The control circuit of the pump motor is provided within the casing of the electric motor, and the pump motor is suitably controlled by the control circuit based on predetermined control conditions. In this case, the control circuit controls the pump motor based on the temperature of the motor or the amount of current passing through the motor. Controlling the pump motor based on the amount of current passing through the electric motor is the same as controlling the pump motor based on the temperature of the electric motor since motor temperature rises when a large current is flowing.

Thus, the power supply lines for supplying power to the cooling motor such as the pump motor, and the control circuit for controlling the cooling motor can be kept from projecting to the outside of the motor casing. As a result, the electric motor of the invention exhibits greatly enhanced reliability.

Still other objects and advantages of the invention will in part be obvious and will in part be apparent from the specification.

The invention accordingly comprises the features of construction, combinations of elements and arrangement of parts which will be exemplified in the construction hereinafter set forth, and the scope of the invention will be indicated in the claims.

BRIEF DESCRIPTION OF THE DRAWINGS

FIGS. 6(A), (B) are views useful in describing a method of controlling the drive of the oil pump;

FIGS. 7(A), (B) are views useful in describing another method of controlling the drive of the oil pump;

FIGS. 8(A), (B) are views useful in describing yet another method of controlling the drive of the oil pump;

FIGS. 9(A), (B) are views useful in describing a further method of controlling the drive of the oil pump;

FIGS. 15(A), (B) are a circuit diagram of a pump motor control circuit and an explanatory view showing control executed by the control circuit, respectively;

FIGS. 16(A), (B) are a circuit diagram of another pump motor control circuit and another explanatory view showing control executed by the control circuit, respectively; and FIGS. 17(A), (B) are a circuit diagram of yet another pump motor control circuit and yet another explanatory view showing control executed by the control circuit, respectively.

DESCRIPTION OF THE PREFERRED EMBODIMENT

Embodiments of the present invention will now be described with reference to the drawings.

Figure 1:
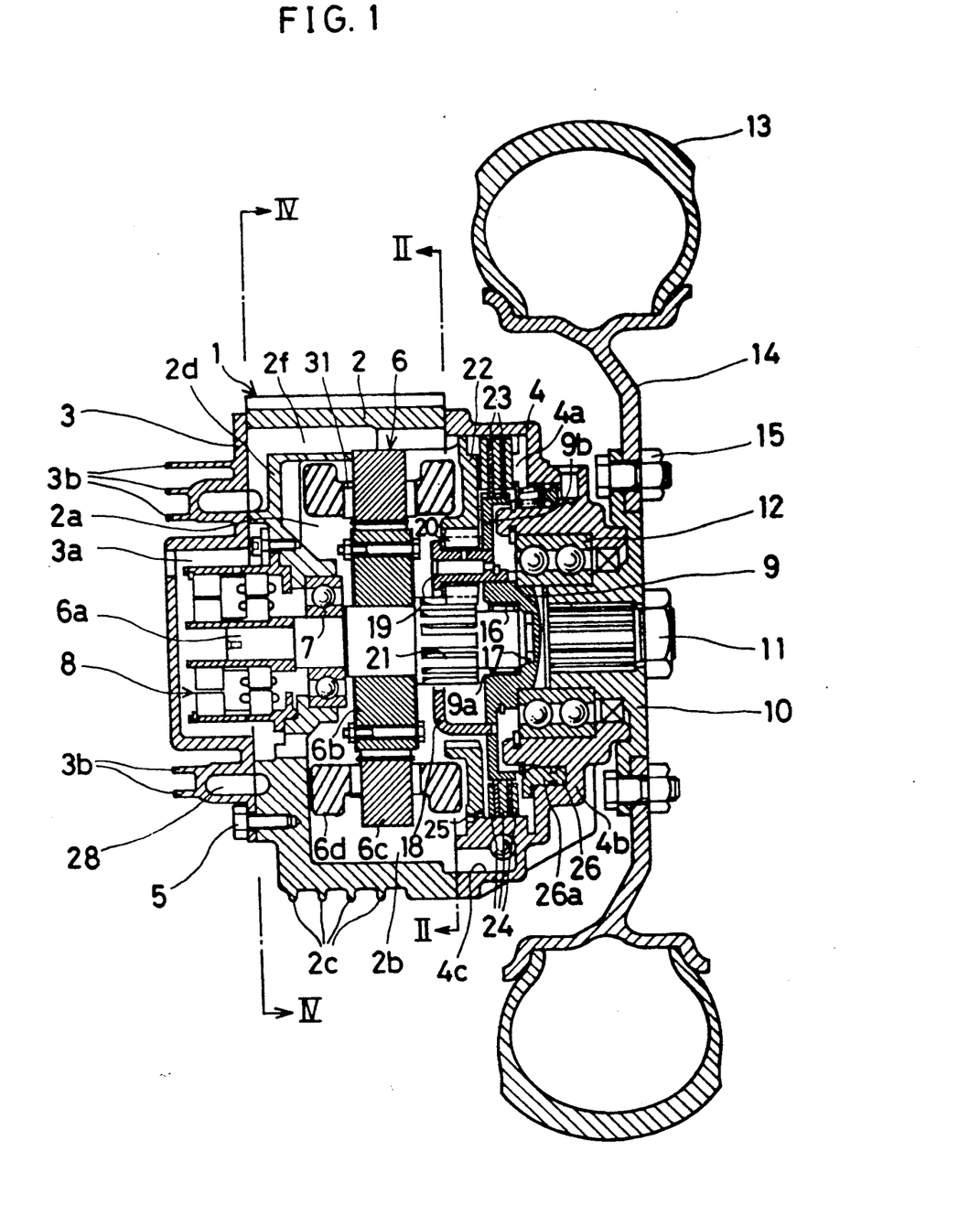
FIG. 1 is a vertical sectional view illustrating an embodiment in which an electric motor equipped with a cooling apparatus according to the invention is applied to a wheel motor of a motorized vehicle.
Figure 2:
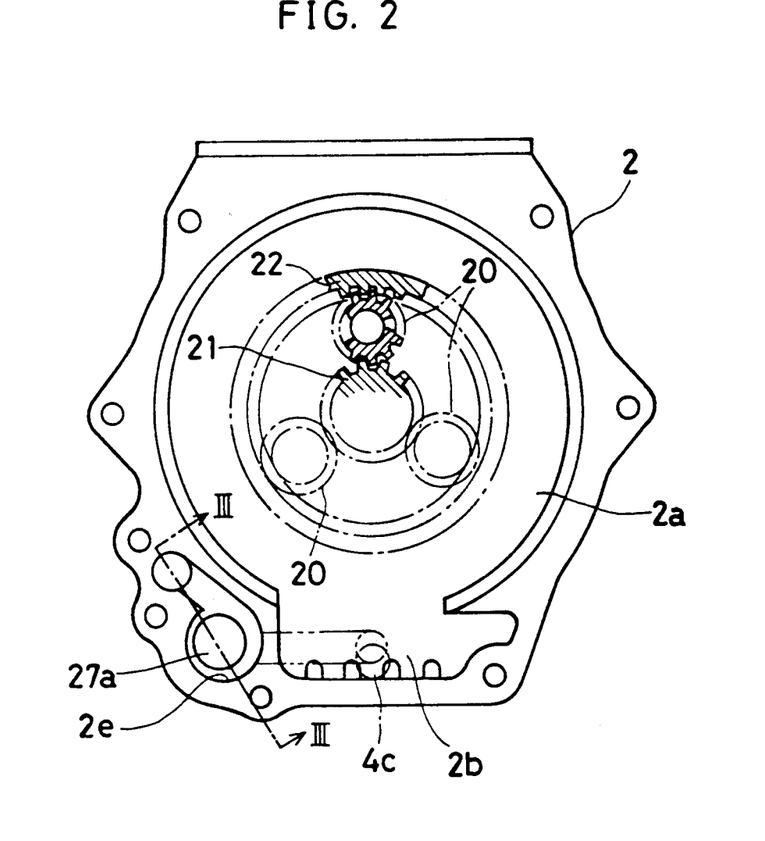
FIG. 2 is a vertical sectional view taken along line II—II of FIG. 1.

As shown in FIGS. 1 and 2, a casing 1 includes a main body 2, and left and right side wall portions 3, 4 joined to the main body 2 by a number of bolts 5 (one shown in FIG. 1). Provided within the main body 2 are a space 2a having a generally-circular cross section, and an oil reservoir 2b situated below the space 2a and communicating therewith. The outer surface of the main body 2 is provided with a number of cooling fins 2c. Provided within the left side wall portion 3 is a space 3a having a circular cross section the diameter of which is smaller than that of the space 2a. The outer surface of the left side wall portion 3 is provided with a number of cooling fins 3b. Provided within the right side wall portion 4 is a space 4a having a circular cross section the diameter of which is approximately the same as that of the space 2a.

A motor 6 is accommodated inside space 2a of the main body 2 and has a rotary shaft 6a rotatably supported on a side wall 2d of the main body 2 by a bearing 7. The motor 6 has a rotor 6b secured to the rotary shaft 6a, and a stator 6c secured to the inner wall of the space 2a.

A sensor 8 for sensing the rotational speed of the motor is accommodated within the space 3a of left side wall portion 3. The movable side of the sensor 8 is secured to the left end of the motor rotary shaft 6a, and the stationary side of the sensor 8 is secured to the side wall 2d of the main body 2.

An output rotary shaft 9 is accommodated in the space 4a of the right side wall portion 4. A wheel hub 10 is splined to the output rotary shaft 9 and is fixed against movement in the axial direction by means of a nut 11. The output rotary shaft 9 and wheel hub 10 are rotatably supported on a side wall 4b by a bearing 12. A wheel 14 supporting a tire 13 is attached to the wheel hub 10 by a nut-and-bolt combination 15.

The left end of the output rotary shaft 9 is formed to include a recess 9a having a circular cross section concentric with central axis of the shaft 9, and with a radially outwardly extending flange 9b.

The right end portion of the motor rotary shaft 6a is inserted into the output rotary shaft 9a and is supported on the shaft 9 in the radial direction by a bearing 16 and in the thrust direction by a bearing 17. The motor rotary shaft 6a and the output rotary shaft 9 are arranged to lie on the same axis and are rotatable relative to each other.

A carrier 18 is attached to the flange 9b near the root thereof. A requisite number of shafts 19, 19 . . . spaced equally in the circumferential direction are provided astride the flange 9b and carrier 18. Planetary gears 20, 20 . . . are rotatably supported on respective ones of these shafts 19. The planetary gears 20 are disposed between a sun gear 21, which is formed on the motor rotary shaft 6a, and a ring gear 22 secured to the inner wall of the right side wall portion 4, and are arranged so as to mesh with these gears 21, 22 at all times. The carrier 18, shafts 19, planetary gears 20, sun gear 21 and ring gear 22 construct a planetary gear speed reducer which couples the motor rotary shaft 6a and the output rotary shaft 9 together.

Two brake disks 23, 23 are splined to the outer periphery of the flange 9b so as to be slidable in the axial direction only. Three friction disks 24, 24, 24 are splined to the inner wall of the right wall portion 4 at positions opposing the outer periphery of the flange 9b so as to be slidable in the axial direction only. In this case, the left-most friction disk 24 is prevented from moving any further to the left by a ring-shaped key 25. The brake disks 23 and the friction disks 24 are interleaved so as to partially overlap each other. Brake cylinders 26, 26 . . . provided on the side wall of the right side wall portion 4 at a number of locations each have a piston 26a. The arrangement is such that the end face of the piston 26a opposes the side face of the right-most friction disk 24. Though the arrangement is not shown, the brake cylinders are connected to a braking force generator such as a master cylinder. The brake disks 23, friction disks 24 and brake cylinders 26 construct a brake unit.

The motor 6, planetary gear unit, output rotary shaft 9 and brake unit are all accommodated within the single casing 1.

Figure 3:
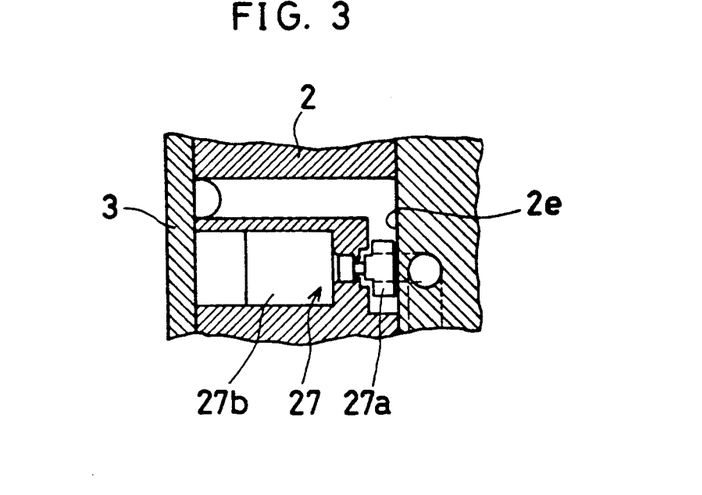
FIG. 3 is a sectional view taken along line III—III of FIG. 2.
Figure 4:
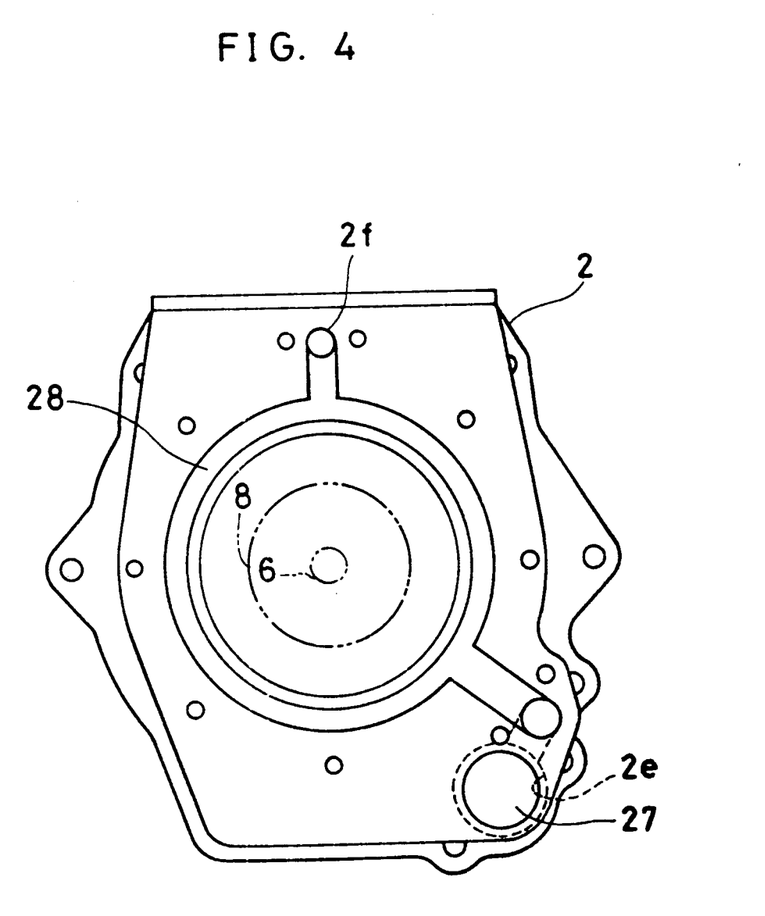
FIG. 4 is a vertical sectional view taken along line IV—IV of FIG. 1.

The oil reservoir 2b provided in the lower portion of the main body 2 is communicated with a passageway 4c formed in the right side wall portion 4. As shown in FIG. 2, the passageway 4c is communicated with a pump chamber 2e formed in the main body 2. As evident from FIG. 3, an oil pump 27 comprising a centrifugal pump has a blade 27a disposed in the pump chamber 2e. The blade 27a is arranged to be rotated by a drive motor 27b fixedly provided on the main body 2. The pump chamber 2e is communicated with an oil cooling chamber 28 formed across the main body 2 and the left side wall portion 3. The oil cooling chamber 28 is formed to have an annular shape, as clearly shown in FIG. 4. The upper portion of the oil cooling chamber 28 is formed so as to communicate with the upper portion of the space 2a of main body 2 by a passageway 2f formed in the main body 2.

Figure 5:
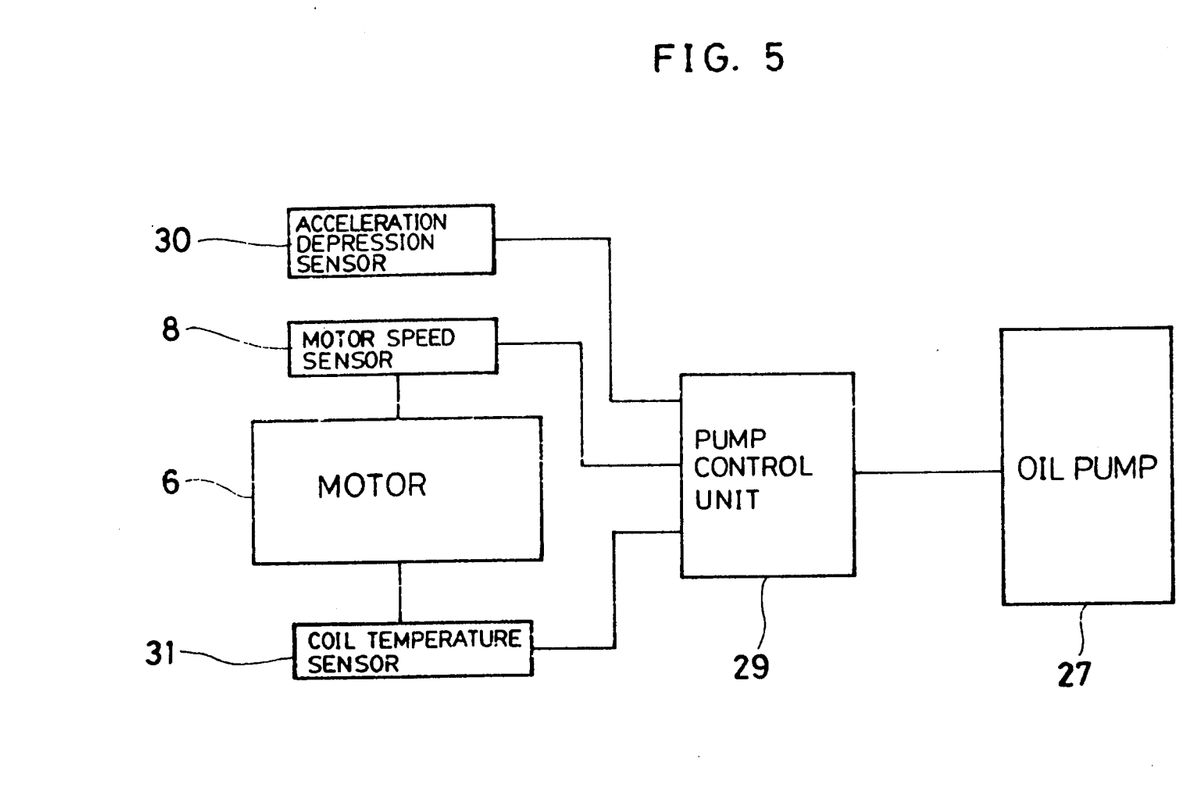
FIG. 5 is a block diagram illustrating drive control of an oil pump of the cooling apparatus.

As illustrated in FIG. 5, the oil pump 27 is connected to a pump control unit 29. Connected to the latter are a sensor 30 for sensing the amount of depression of an accelerator pedal, the sensor 8 for sensing the rotational speed of the motor, and a coil temperature sensor 31 embedded in the coil 6d of the stator 6c.

The operation of this embodiment will now be described.

When the driver steps down on an accelerator pedal, not shown, a current the amount of which is commensurate with the amount of accelerator pedal depression flows into the coil 6d of motor 6. As a result, the motor 6 is driven into operation to rotate its rotary shaft 6a. In this case, the current flowing into the coil 6d is controlled by a controller, not shown, based on a signal indicative of the amount of accelerator pedal depression, an output signal from the motor rotation sensor 8, and a forward signal from a forward/reverse setting unit, not shown. The motor rotary shaft 6a therefore is rotated in the forward direction at a set torque.

The rotational motion of the motor rotary shaft 6a is transmitted to the planetary gears 20 via the sun gear 21 so that the planetary gears 20 rotate about their respective shafts 19. In consequence, the planetary gears 20 revolve about the central axis of the motor rotary shaft 6a while meshing with the teeth of the sun gear 22. Owing to the revolution of the planetary gears 20, the output rotary shaft 9 is rotated via the carrier 18 and flange 9b. In this case, the rotating speed of the output rotary shaft 9 is reduced at a predetermined reduction ratio relative to the rotating speed of the motor rotary shaft 6a by means of the planetary gear speed reducing unit.

When the output rotary shaft 9 rotates, the tire 13 is rotated via the wheel hub 10 and wheel 14. Accordingly, the vehicle is propelled in the forward direction. If the accelerator pedal is depressed even further, the torque of the motor 6 rises and, hence, the vehicle travels at a higher speed.

In order to applying braking, a brake pedal (not shown) is depressed to introduce braking oil pressure into the braking cylinder 26. The braking oil pressure moves the piston 26a leftward so as to apply a pressing force to the friction plate 24. As a result, the friction plate 24 applying clamping pressure to the brake disk 23, thereby braking the vehicle.

If the vehicle is to be moved in reverse, this can be accomplished by setting the forward/reverse setting unit to reverse.

When current flows into the coil 6d, the coil is caused to produce heat. In order to deal with the heat evolved, the oil pump 27 is driven into operation. As a result, the oil in the oil reservoir 2b is caused to flow in circulating fashion through the passageway 4c, pump chamber 2e, oil cooling chamber 28, passageway 2f and space 2a before returning to the oil reservoir 2b. During this circulatory flow, the oil comes into contact with and cools the coil 6d, the rotor 6b, etc. Though the oil thus absorbs heat and becomes warm itself, the heat possessed by the oil is given off to the outside through the casing 1 during the aforementioned circulatory flow of the oil through the lengthy oil passageways. In particular, the heat possessed by the oil is dissipated effectively in the oil reservoir 2b and cooling chamber 28 by means of the cooling fins 2c, 3b. The oil so reduced in temperature is circulated to repeatedly cool the coil 6d.

The cooling apparatus of the present invention is thus constructed by the oil reservoir 2b, the long passageways through which the oil is circulated, the oil pump 27 and the cooling fins 2c, 3d. Thus, the cooling apparatus is provided in a form integrated with the casing 1.

As shown in FIG. 5, the oil pump 27 is controlled by the pump control unit 29 based on output signals from the motor rotational speed sensor 8, the accelerator pedal depression sensor 30 and the coil temperature sensor 31.

The method through which the oil pump 27 is controlled will now be described.

Figure 6:
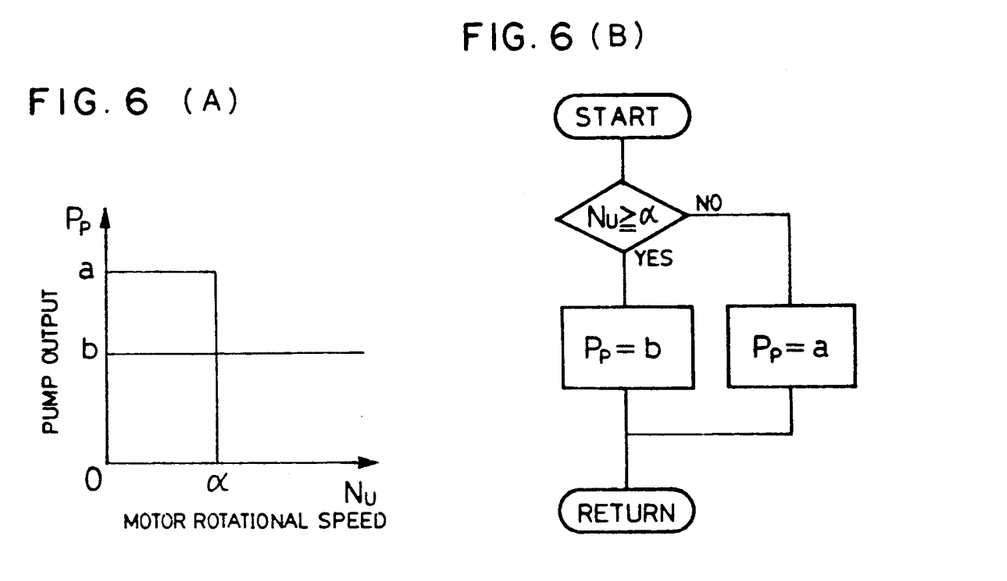

FIGS. 6(A), (B) illustrate a method of controlling the oil pump 27 using the rotational speed of the motor 6 as a control parameter.

As depicted in FIG. 6(A), the oil pump 27 is driven into operation along with the motor 6. When the rotational speed $N_U$ of the motor 6 is less than a constant rotational speed $\alpha$, pump rotation output $P_P$ is set to a comparatively large value a. When the rotational speed $N_U$ of the motor 6 exceeds the constant rotational speed $\alpha$, pump rotation output $P_P$ is set to a value b, which is smaller than the value a. Thus, the oil pump 27 is controlled in such a manner that its output exhibits a two-step variation.

When the motor 6 rotates at a high speed, the oil is subjected to a strong stirring motion that causes the motor 6 to cool off. Accordingly, by thus controlling the oil pump 27, the amount of oil fed increases when the cooling effect ascribable to agitation of the oil is small at a low rotational speed of the motor 6, and decreases when the aforementioned cooling effect is strengthened by a rise in the rotational speed of the motor 6. As a result, energy is not wastefully consumed and the motor 6 can be cooled in an efficient manner. A flowchart illustrating this control of oil pump 27 is as shown in FIG. 6(B).

Figure 7:
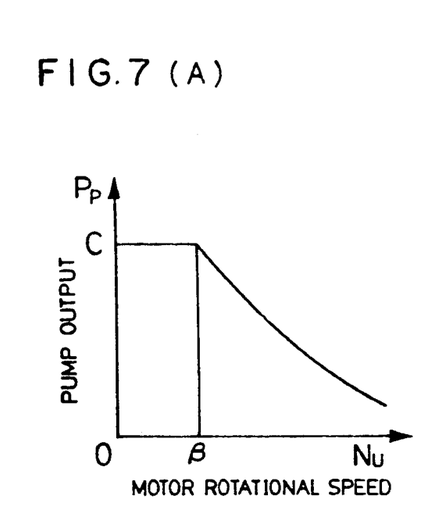

It is also possible to adopt a control method of the kind shown in FIG. 7(A). The function here is one in which pump rotation output $P_P$ gradually declines with an increase in the rotational speed $N_U$ of the motor 6 when $N_U$ exceeds a fixed rotational speed $\beta$. In other words, the oil pump is set to abide by the relation $P_P = f_1(N_U)$. Controlling the oil pump 27 in this manner makes it possible to conserve even more energy and to cool the motor 6 more effectively. A flowchart illustrating this control of oil pump 27 is as shown in FIG. 7(B).

Figure 8:
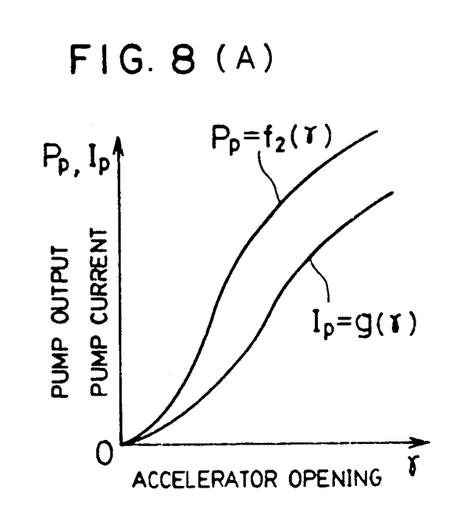

FIGS. 8(A), (B) illustrate a method of controlling the oil pump 27 using accelerator opening 6 as another control parameter.

As shown in FIG. 8(A), the arrangement set is such that pump rotation output $P_P$ is a function of accelerator opening $\gamma$. In other words, the oil pump is set to abide by the relation $P_P = f_2(\gamma)$. In accordance with this function, pump rotation output $P_P$ rises with an increase in accelerator opening $\gamma$, and the arrangement is such that the rate of increase in $P_P$ becomes comparatively small in the region where the accelerator opening is small. In order to thus control the oil pump 27, it will suffice to control current $I_P$ supplied to the motor 27b in accordance with the function expressed by $I_P = g(\gamma)$.

In accordance with this control method, therefore, the load with respect to the motor 6 may be considered to be small when the accelerator opening is small; hence, the oil pump 27 can be driven and controlled efficiently. A flowchart illustrating this control of oil pump 27 is as shown in FIG. 8(B).

In a method of controlling vehicle velocity in accordance with accelerator opening, a target rotational speed $N_0$ is uniquely decided with respect to the amount of accelerator pedal depression. However, there are many cases in which the actual rotational speed $N_U$ of the motor 6 does not attain the target rotational speed $N_N$ because a load is being applied to the motor 6. Consequently, if the pump rotation output is merely controlled as a function of throttle opening, as set forth above, there are cases where such control is ineffective.

Figure 9:
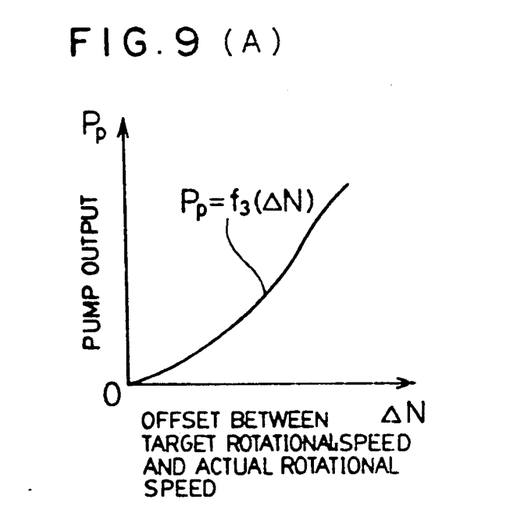

Accordingly, a control method of the kind shown in FIG. 9(A) can be adopted, in which an offset $\Delta N (= N_O - N_U)$ between actual rotational speed $N_U$ and target rotational speed $N_O$ is regarded as the load of the motor 6, and the oil pump 27 is controlled in accordance with the relation $P_P = f_3(\Delta N)$, namely where $P_P$ is a function of the offset $\Delta N$. Adopting such an expedient makes it possible to control the oil pump 27 more effectively. A flowchart illustrating this control of oil pump 27 is as shown in FIG. 9(B).

The methods of controlling the oil pump 27 described thus far are premised on an expectation that the coil 6d of the motor will produce heat. These methods can be thought of as being intended to prevent heating of the motor coil 6d before such heating occurs. However, it is possible to adopt an arrangement in which the oil pump 27 is controlled upon sensing that the motor coil 6d has actually produced heat.

Figure 10A:
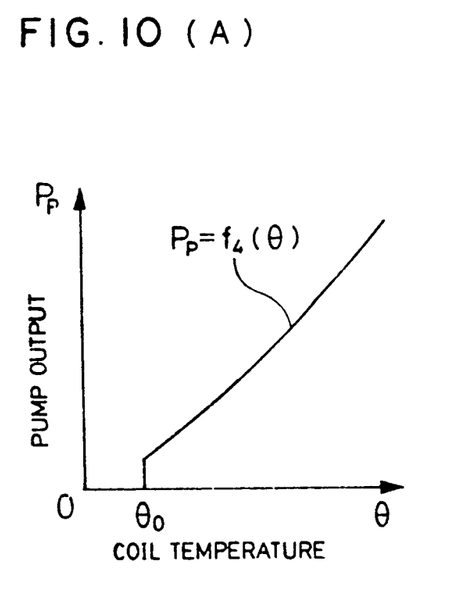
FIGS. 10(A), (B) are views useful in describing a further method of controlling the drive of the oil pump.
Figure 10B:
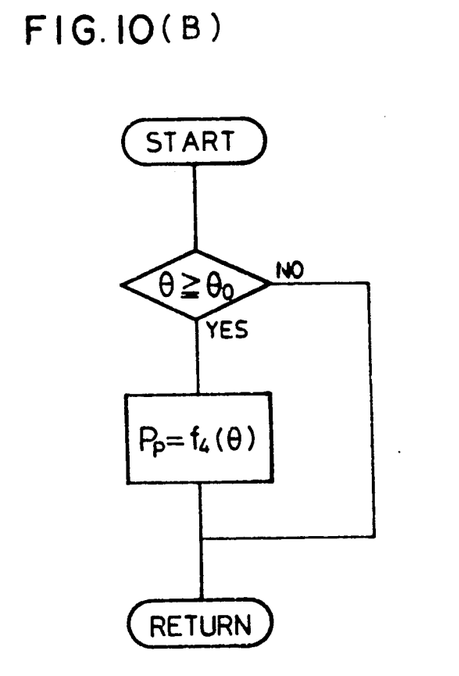

FIGS. 10(A), (B) illustrate such a control method, in which the oil pump 27 is controlled using the temperature of the motor coil 6d.

As shown in FIG. 10(A), the oil pump 27 is driven into operation when temperature $\theta$ of the coil 6d rises above a fixed temperature $\theta_0$. This control of pump drive is carried out based on a function $P_P = f_4(\theta)$, in which the pump rotation output $P_P$ grows larger with a rise in the coil temperature $\theta$. A flowchart illustrating this control of oil pump 27 is as shown in FIG. 10(B). Controlling the oil pump 27 in this way enables the coil 6d of the motor to be cooled more reliably.

The oil that cools the coil 6d of the motor flows through the bearings 7, 12, 16, 17 and the gears 20, 21, 22, thereby lubricating these elements. By thus using the oil for both cooling and lubrication, it is unnecessary to provide an oil seal between the space 2a and the space 4a. The result is a more compact motor.

The wiring for connecting the power supply to the motor 6 a pump motor 27b will now be described.

Figure 11:
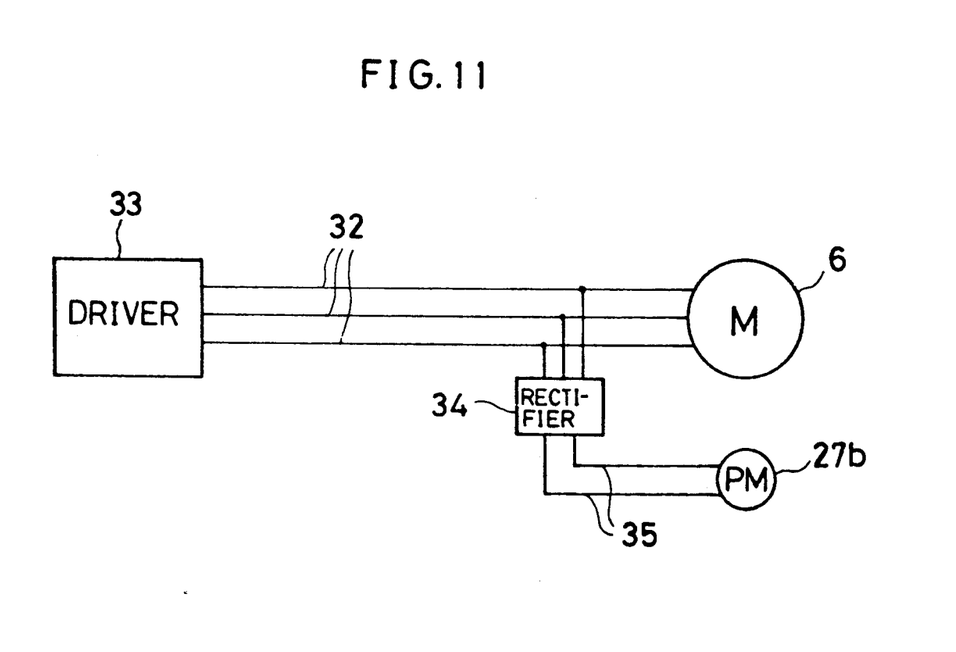
FIG. 11 is a circuit diagram of a power supply circuit for supplying power to an electric motor and a pump motor.
Figure 12:
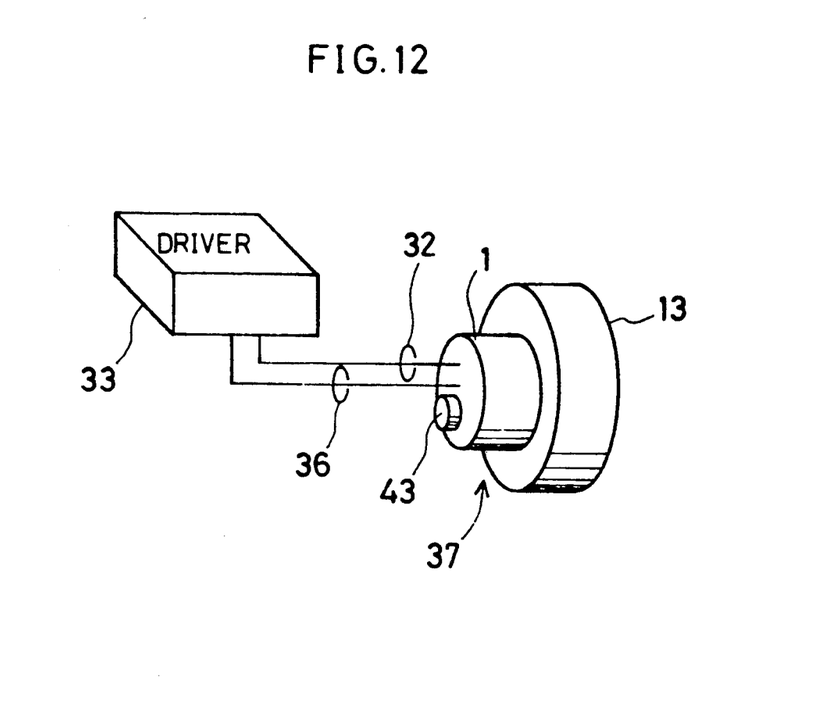
FIG. 12 is a schematic perspective view showing the manner in which a wheel motor is connected to a power supply.

As illustrated in FIG. 11, the motor 6 is constituted by a three-phase motor, which is connected by power supply lines 32, 32, 32 to a driver 33 that controls the amount of current of motor 6. The pump motor 27b is connected to the power supply lines 32 of motor 6 by power supply lines 35, 35 via a rectifier 34. The power supply lines 32 and the power supply lines 35 are connected inside the casing 1. Accordingly, though the power supply lines 32 of the motor 6 extend to the outside of the casing 1 in order to be connected to the driver 33, the power supply lines 35 of the pump motor 27b do not extend to the outside of the casing 1, as is shown in FIG. 12. In other words, the power supply lines that extend to the outside of the casing 1 are reduced by an amount corresponding to the power supply lines of the pump motor 27b. Further, as evident from FIG. 12, electric lines 36 for magnetic pole detection are arranged between the motor 6 and the power supply 33.

Figure 13:
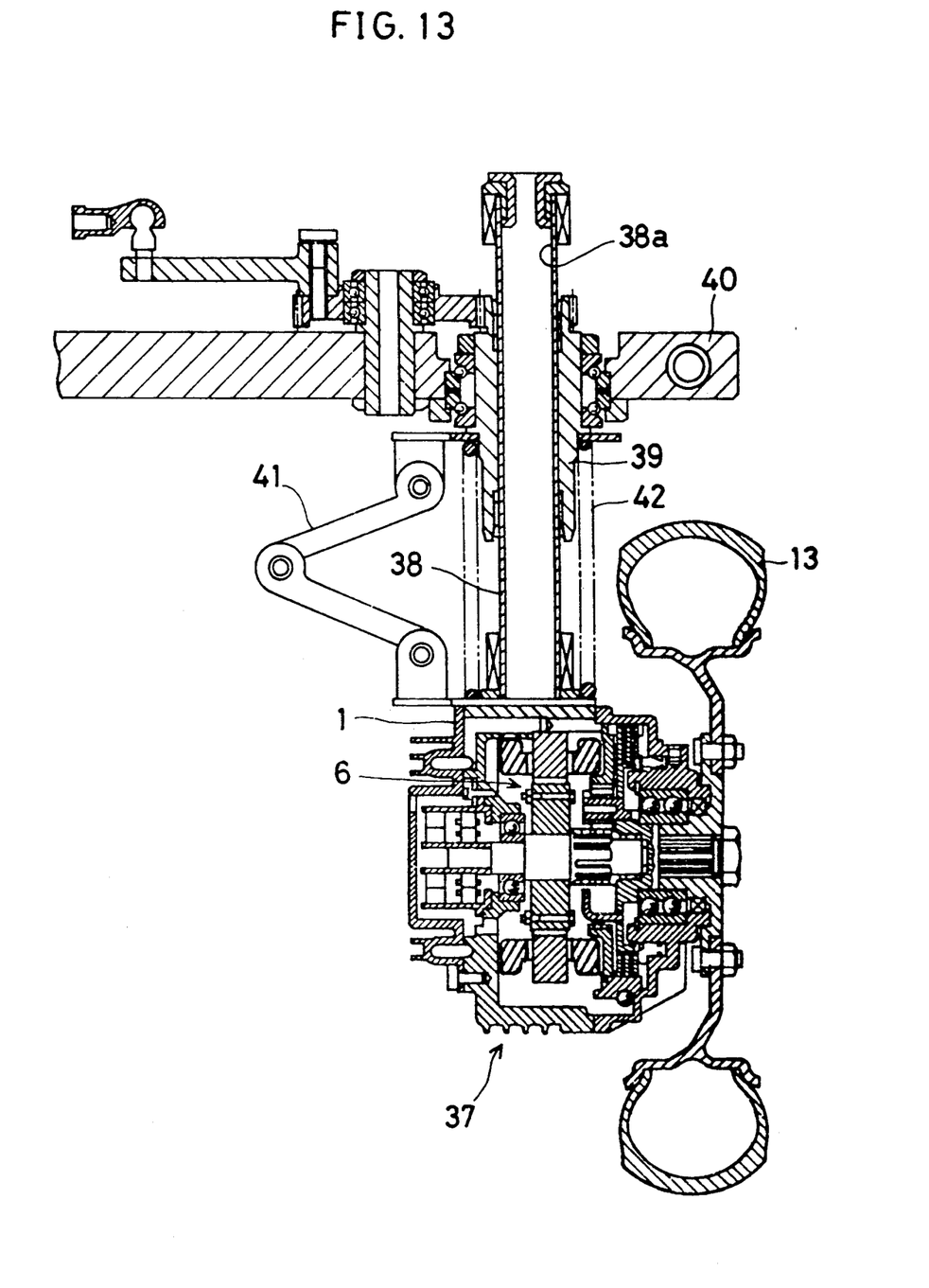
FIG. 13 is a schematic sectional view illustrating the manner in which a wheel motor is attached to a body frame.

The motor thus constructed is, by way of example, directly coupled to the tire 13 to construct a wheel motor 37, as shown in FIG. 13.

A columnar swivel shaft 38 is projectively provided on the upper part of the casing 1 of wheel motor 37. Fitted over the swivel shaft 38 via a suitable bearing is a cylindrical member 39 for transmitting steering torque. The cylindrical member 39 is supported on a main frame 40 so as to be freely rotatable. Accordingly, the wheel motor 37 is free to turn about the central axis of the swivel shaft 38 and is movable up and down. The cylindrical member 39 and the wheel motor 37 are coupled to each other by a torque link 41, by virtue of which steering torque is transmitted to the wheel motor 37. The torque link 41 is free to flex so that the wheel motor 37 is allowed to move up and down. A compression coiled spring 42 for absorbing shock is interposed between cylindrical member 39 and the wheel motor 37. The swivel shaft 38, cylindrical member 39 and spring 42 construct a suspension. The arrangement is such that the power supply lines 32 and electric lines 36 for pole detection pass through a hole 38a in the swivel shaft 38.

The operation of the motor having the power supply lines arranged in this manner will now be described.

When the driver steps down on an accelerator pedal, not shown, a current the amount of which is commensurate with the amount of accelerator pedal depression flows into the coil 6d of motor 6 through power supply lines 32, 32, 32. As a result, the motor 6 is driven into operation to rotate its rotary shaft 6a. In this case, the current flowing into the coil 6d is controlled by the driver 33 based on a signal indicative of the amount of accelerator pedal depression, an output signal from the motor rotation sensor 8, and a forward signal from the forward/reverse setting unit, not shown. The motor rotary shaft 6a therefore is rotated in the forward direction at a set torque.

The rotational motion of the motor rotary shaft 6a is transmitted to the tire 13, in a manner similar to that described above, thereby rotating the tire 13. The vehicle is propelled forward as a result. To drive the vehicle in reverse, operation is the same as described earlier and a discussion thereof is omitted.

In this arrangement of the motor, the motor 6, the cooling apparatus and the power supply lines 35 of the pump motor 27 are all accommodated within the casing 1 in integrated fashion. As a result, the overall motor is made extremely compact.

Figure 14:
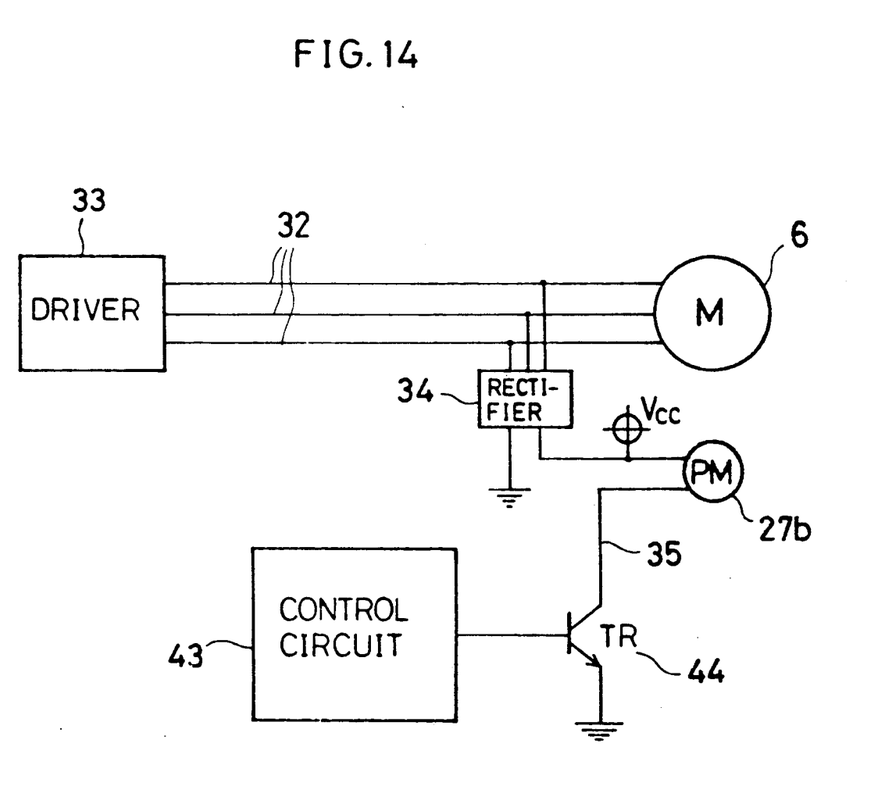
FIG. 14 is a circuit diagram of another power supply circuit for supplying power to an electric motor and a pump motor.

FIG. 14 is an explanatory view for a case in which the pump motor 27b in the motor having the power supply lines arranged as set forth above is controlled very finely by a control circuit 43.

As clearly shown in FIG. 14, a transistor 44 serving as a drive switch for the pump motor 27b is inserted in power supply line 35. It is arranged so that this transistor 44 has its on/off action controlled by the control circuit 43. As shown in FIG. 12, the control circuit 43 is arranged on the casing 1. In this way the pump motor 27b can be controlled entirely within the motor apparatus proper.

Figure 15:
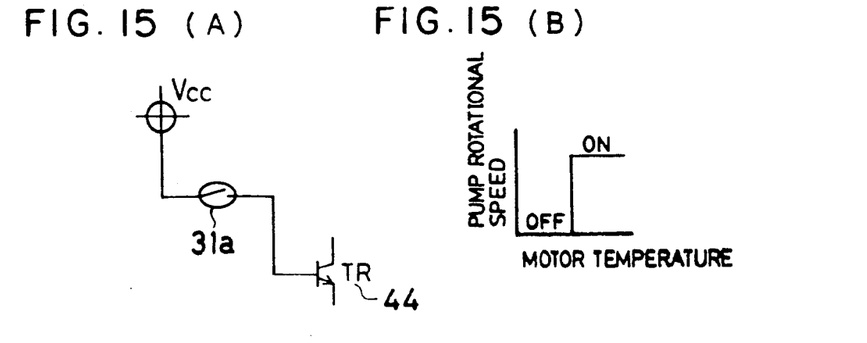

As shown in FIG. 15(A), a thermoswitch 31a serving as the temperature sensor 31 is provided within the control circuit 43. The thermoswitch 31a closes when the temperature of the coil 6d of motor 6 attains a predetermined temperature, thereby turning on the transistor 44. Accordingly, when the coil 6d of motor 6 attains the predetermined temperature, the pump motor 27b is driven into operation to actuate the oil pump 27, as a result of which the oil is applied to the coil 6d of the motor to cool the same. Since the thermoswitch 31a in this case is a simple on/off switch, the output of transistor 44 is substantially constant, so that the rotational speed of the pump is rendered constant, as shown in FIG. 15(B).

Figure 16:
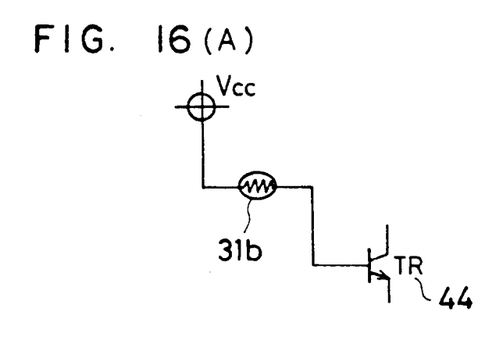

As illustrated in FIG. 16(A), a thermister 31b serving as the temperature sensor 31 is provided within the control circuit 43. The resistance of thermister 31b diminishes linearly with a rise in the temperature of the motor 6. Accordingly, the output of the transistor 44 increases with a rise in the temperature of the motor 6, so that the rotational speed of the pump also increases linearly with a rise in the temperature of the motor 6, as depicted in FIG. 16(B).

Figure 17:
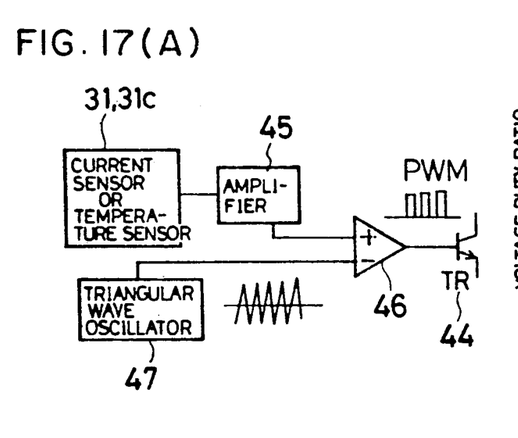

FIG. 17(A) illustrates a case in which the control circuit 43 controls the pump motor 27b based on duty control.

An output signal from the temperature sensor 31 or from a current sensor 31c that is disposed in the power supply line 32 of motor 6 is amplified by an amplifier 45 before being applied to a non-inverting input terminal of a comparator 46. Meanwhile, a triangular signal from a triangular wave oscillator 47 is applied to the inverting input terminal of the comparator 46. The comparator 46 outputs a duty wave signal by which the transistor 44 is controlled. As a result, the voltage duty ratio increases with an increase in the amount of current to motor 6 or a rise in the temperature of the motor 6. That is, the pump motor 27b is controlled in accordance with duty control. Such duty control makes it possible to raise the efficiency at which the transistor 44 operates. Controlling the pump motor 27b based on the amount of current to the motor 6 is control performed from the viewpoint that the amount of current is substantially proportional to temperature. In terms of control, this is essentially equivalent to control based on temperature.

The oil that cools the coil 6d of the motor 6 flows through the bearings 7, 12, 16, 17 and the gears 20, 21, 22, thereby lubricating these elements. By thus using the oil for both cooling and lubrication, it is unnecessary to provide an oil seal between the space 2a and the space 4a. The result is a more compact motor.

In the foregoing embodiment, the entirety of the long oil passageway through which the oil is circulated is provided in the housing 1. However, the invention is not limited to this arrangement, for it is permissible for part of the oil passageway to be provided in the housing and part thereof to be formed by a pipe. By thus forming part of the passageway of a pipe particularly where the casing has a complicated configuration, manufacture is facilitated.

Though oil is used as the cooling medium in the foregoing embodiment, air can be used instead. In such case, a cooling fan would be employed instead of the oil pump 27, and the power supply lines of the cooling fan motor would be connected to the power supply lines 32 of motor 6 inside the casing 1.

The motor equipped with the cooling apparatus of the invention not only can be used as a wheel motor for a motorized vehicle but can also be applied in various other arrangements where a small-size, high-output motor is required.

As apparent from the foregoing description, the cooling apparatus, which comprises the oil reservoir, at least part of the oil passageway and the oil pump, is provided in the casing so as to be integrated therewith. As a result, the motor is not increased significantly in size despite the provision of the cooling apparatus, and the overall motor is compact and light in weight. Accordingly, space for installation of the cooling apparatus is not required. The inventive motor equipped with the cooling apparatus therefore can be readily mounted even if the space available is limited.

By providing the cooling apparatus, cooling of the motor can be carried out in positive fashion. Since this makes it possible to pass a large current into the coil, the motor is capable of generating a high output torque.

Furthermore, by using the motor of the present invention in a motorized vehicle, vertical and lateral motion of the wheels can be set freely. This has the effect of enhancing the design freedom of the vehicle.

Since the cooling apparatus of the motor according to the invention is such that the motor for driving the oil pump is controlled based on output signals from sensor which detect the traveling state of the vehicle, the oil pump is driven under optimum conditions and only when required. This means that energy is not consumed wastefully and that the wheel driving motor can be cooled very efficiently.

Since the oil pump is not driven unnecessarily, its service life is prolonged and durability enhanced.

Since the power supply lines of the pump motor are connected to the power supply lines of the motor inside the casing, the power supply lines of the pump motor to not extend to the outside of the casing. Accordingly, the number of power supply lines extending outside the casing can be reduced to improve reliability. In particular, when the motor of the invention is used in a motorized vehicle, the number of power supply lines passing through a movable element such as suspension is reduced. This is especially effective in enhancing reliability.

As many apparently widely different embodiments of the present invention can be made without departing from the spirit and scope thereof, it is to be understood that the invention is not limited to the specific embodiments thereof except as defined in the appended claims.

What we claim is:

1. An electric motor for a vehicle equipped with a wheel driving motor accommodated within a case on which a rotary shaft is rotatably supported, said electric motor comprising:
   an oil reservoir formed within the case;
   an oil pump provided within the case;
   an oil passage communicating said oil pump with said oil reservoir;
   communicating means connected between said oil pump and a coil of the wheel driving motor for supplying oil to the coil of the wheel driving motor;
   a pump driving motor for driving said oil pump;
   a sensor for sensing a vehicle traveling state; and
   a motor control unit to which a signal from said sensor is inputted for controlling said pump driving motor.

2. The electric motor according to claim 1, wherein the power supply lines of said pump driving motor are connected to the power supply lines of said wheel driving motor.

3. The electric motor according to claim 1, wherein said sensor detects a rotational speed of the wheel driving motor and said motor control unit controls the pump driving motor in accordance with the rotational speed of the wheel driving motor.

4. The electric motor according to claim 1, wherein said sensor detects an accelerator opening of a vehicle and said motor control unit controls the pump driving motor in accordance with the accelerator opening of the vehicle.

5. The electric motor according to claim 1, wherein said sensor detects a temperature of the coil for the wheel driving motor and said motor control unit controls the pump driving motor in accordance with the temperature of the coil for the wheel driving motor.

6. The electric motor according to claim 1, wherein said sensor detects an amount of current of the wheel driving motor and said motor control unit controls the pump driving motor in accordance with the amount of current of the wheel driving motor.

* * * * *